US010705607B2

(12) United States Patent
Sato

(10) Patent No.: US 10,705,607 B2
(45) Date of Patent: Jul. 7, 2020

(54) OPERATION CONTROL SYSTEM, WEARABLE APPARATUS, OPERATION CONTROL METHOD, AND OPERATION CONTROL PROGRAM

(71) Applicant: SEIKO EPSON CORPORATION, Tokyo (JP)

(72) Inventor: Reiko Sato, Azumino (JP)

(73) Assignee: SEIKO EPSON CORPORATION, Tokyo (JP)

(*) Notice: Subject to any disclaimer, the term of this patent is extended or adjusted under 35 U.S.C. 154(b) by 0 days.

(21) Appl. No.: 15/854,411

(22) Filed: Dec. 26, 2017

(65) Prior Publication Data

US 2018/0188808 A1 Jul. 5, 2018

(30) Foreign Application Priority Data

Jan. 5, 2017 (JP) ................. 2017-000776

(51) Int. Cl.
| G06F 3/01 | (2006.01) |
| G06F 1/16 | (2006.01) |
| G04G 21/04 | (2013.01) |
| G04G 21/02 | (2010.01) |

(52) U.S. Cl.
CPC ........... G06F 3/015 (2013.01); G04G 21/025 (2013.01); G04G 21/04 (2013.01); G06F 1/163 (2013.01); G06F 1/1698 (2013.01); G06F 3/017 (2013.01)

(58) Field of Classification Search
CPC ....................................................... G06F 21/31
See application file for complete search history.

(56) References Cited

U.S. PATENT DOCUMENTS

| 2007/0068245 A1* | 3/2007 | Blondeau ................. G01C 5/06 73/179 |
| 2014/0244505 A1* | 8/2014 | Kim ........................ G06F 3/014 705/44 |
| 2015/0102961 A1* | 4/2015 | Tomii ...................... G01S 19/34 342/357.51 |
| 2015/0111558 A1* | 4/2015 | Yang ...................... G04G 21/04 455/418 |
| 2015/0182130 A1* | 7/2015 | Utter, II ............... A61B 5/0205 600/483 |
| 2016/0073886 A1* | 3/2016 | Connor .............. G09B 19/0092 600/475 |
| 2016/0165037 A1* | 6/2016 | Youn ..................... H04W 8/005 455/557 |
| 2017/0075305 A1* | 3/2017 | Ryu ...................... G04G 9/0064 |
| 2017/0329419 A1* | 11/2017 | Dearman ............. G06F 3/0346 |

FOREIGN PATENT DOCUMENTS

| JP | 2012-189604 A | 10/2012 |
| JP | 2016-134063 A | 7/2016 |

\* cited by examiner

Primary Examiner — Rayeez R Chowdhury
(74) Attorney, Agent, or Firm — Oliff PLC

(57) ABSTRACT

An operation control system includes a wearable apparatus that is mounted with a first sensor, and a measurement apparatus that is configured separately from the wearable apparatus, and transmits a measurement result in a second sensor mounted thereon to the wearable apparatus, in which the wearable apparatus includes an information acquisition unit that acquires the measurement result in the second sensor, transmitted from the measurement apparatus, and an operation control unit that controls a predetermined operation on the basis of the acquired measurement result in the second sensor, and a measurement result in the first sensor.

10 Claims, 11 Drawing Sheets

OPERATION CONTROL SYSTEM, WEARABLE APPARATUS, OPERATION CONTROL METHOD, AND OPERATION CONTROL PROGRAM

CROSS-REFERENCE TO RELATED APPLICATION

This application claims priority of Japanese Patent Application No. 2017-000776, filed Jan. 5, 2017, which is expressly incorporated herein by reference thereto in its entirety.

BACKGROUND

1. Technical Field

The present invention relates to an operation control system, a wearable apparatus, an operation control method, and an operation control program.

2. Related Art

In the related art, there is a positioning device (for example, refer to JP-A-2012-189604) which is configured in a wristwatch type of being mountable on the arm of a user, performs positioning by receiving satellite data from a global positioning system (GPS) satellite, and acquires a position of the positioning device.

The positioning device disclosed in JP-A-2012-189604 includes a vibration detection unit, and stops a positioning operation in a case where a state in which the positioning device does not vibrate lasts for a predetermined time, that is, a user wearing the positioning device does not move for a predetermined time on the basis of a detection result in the vibration detection unit.

JP-A-2012-189604 also discloses a positioning device including a temperature detection unit, an inclined angle detection unit, or an acceleration detection unit instead of the vibration detection unit.

Above all, the positioning device including the temperature detection unit performs or stops positioning on the basis of a temperature change between the present detection result and the previous detection result in the temperature detection unit. In other words, in a case where the temperature change is an increase, it is determined that the positioning device is mounted on the arm of a user, the positioning device performs positioning, and, in a case where the temperature change is a decrease, it is determined that the positioning device is demounted from the arm of the user, the positioning device stops positioning.

The positioning device including the inclined angle detection unit determines a state in which a user wears the positioning device and starts to walk, and performs positioning, in a case where it is determined that an inclined angle continuously changes for a predetermined time on the basis of a detection result in the inclined angle detection unit, and determines that the user demounts the positioning device and stops positioning in a case where it is determined that an inclined angle is constant.

The positioning device including the acceleration detection unit performs positioning in a case where it is determined that acceleration is continuously detected on the basis of a detection result in the acceleration detection unit, and stops positioning in a case where it is determined that acceleration is not continuously detected.

In the above-described way, the positioning device omits a wasteful positioning operation in a state in which positioning is not necessary, and can thus increase a service life of a battery and achieve miniaturization of the device.

However, even if the positioning device disclosed in JP-A-2012-189604 tries to receive satellite data, there is a case where the positioning device is actually put into a situation of it being hard to receive the satellite data. For example, there is a case where satellite data hardly reaches indoors, and thus it is difficult to receive the satellite data even if positioning is performed indoors, and there is a problem in terms of accuracy and reliability of the received satellite data even if the satellite data can be received.

On the other hand, as in the positioning device, in an electronic apparatus which includes a detection unit detecting predetermined information, and controls a predetermined operation on the basis of a detection result in the detection unit, there is a possibility that satellite data cannot be received, and a process cannot be completed correctly depending on the surrounding environment or a user state.

Thus, there is a need for a configuration capable of increasing a possibility that a predetermined operation can be appropriately performed.

SUMMARY

An advantage of some aspects of the invention is to provide an operation control system, a wearable apparatus, an operation control method, and an operation control program, capable of increasing a possibility that a predetermined operation can be appropriately performed.

An operation control system according to an aspect of the invention includes a wearable apparatus that is mounted with a first sensor; and a measurement apparatus that is configured separately from the wearable apparatus, and transmits a measurement result in a second sensor mounted thereon to the wearable apparatus, in which the wearable apparatus includes an information acquisition unit that acquires the measurement result in the second sensor, transmitted from the measurement apparatus, and an operation control unit that controls a predetermined operation on the basis of the acquired measurement result in the second sensor, and a measurement result in the first sensor.

According to the aspect of the invention, the operation control unit of the wearable apparatus controls the predetermined operation on the basis of not only a measurement result in the first sensor mounted on the wearable apparatus but also a measurement result in the second sensor of the measurement apparatus. Consequently, the number of measurement results can be increased, and a measurement item which cannot be measured in the wearable apparatus can be measured by the measurement apparatus configured separately. Even in a case where the first sensor and the second sensor measure the same measurement item, measurement positions (measurement points) of the measurement item can be made different from each other. Thus, it is possible to control the predetermined operation on the basis of measurement results of a plurality of measurement items or measurement results at different measurement positions. Therefore, it is possible to increase a possibility that the predetermined operation performed by the wearable apparatus can be appropriately performed.

In the aspect of the invention, it is preferable that the wearable apparatus further includes a reception unit that receives an electric wave transmitted from the outside, and the operation control unit controls reception of the electric wave as the predetermined operation.

The electric wave transmitted from the outside may include, for example, an electric wave such as a satellite signal or a standard electric wave, and may also include an electric wave based on a wireless communication standard.

According to the aspect of the invention with this configuration, for example, in a case where a measurement item in which whether or not reception of the electric wave can be performed can be determined is measured by the first sensor and the second sensor, it is possible to perform control such that the electric wave is received in a case where the electric wave can be favorably received, and the electric wave is not received in a case where the electric wave is hard to receive, on the basis of measurement results in the first sensor and the second sensor. Therefore, since the electric wave is received in a case where the electric wave can be favorably received, it is possible to increase a probability that the electric wave can be received correctly, and also to suppress useless power consumption since the electric wave is not received in a case where the electric wave is hard to receive.

In the aspect of the invention, it is preferable that the wearable apparatus further includes a display unit that displays predetermined information, and the operation control unit controls display on the display unit as the predetermined operation.

According to the aspect of the invention with this configuration, in a case where it is determined that there is no problem, for example, even if the display unit is brought into a non-display state, on the basis of measurement results in the first sensor and the second sensor, it is possible to reduce power consumption by performing such an operation. It is possible to perform display suitable for surrounding environments of the wearable apparatus and the measurement apparatus or a user's state of the wearable apparatus on the basis of the measurement results.

In the aspect of the invention, it is preferable that the first sensor measures at least one of biological information of a wearer wearing the wearable apparatus, body motion information of the wearer, and a surrounding environment of the wearable apparatus, and the second sensor measures a surrounding environment of the measurement apparatus.

According to the aspect of the invention with this configuration, the first sensor and the second sensor measure the above-described measurement items, and thus it is possible to control the predetermined operation according to surrounding environments of the wearable apparatus and the measurement apparatus or a wearer's state of the wearable apparatus. Therefore, it is possible to increase a possibility that an operation of which a probability of success changes depending on the usage environments or usage states of the wearable apparatus, or an operation suitable for the usage environments and the usage states can be appropriately performed.

A wearable apparatus according to an aspect of the invention includes a first sensor; an information acquisition unit that acquires a measurement result in a second sensor from an external apparatus which is separately configured and is mounted with the second sensor; and an operation control unit that controls a predetermined operation on the basis of the acquired measurement result in the second sensor, and a measurement result in the first sensor.

According to the aspect of the invention, the wearable apparatus is used in combination with the measurement apparatus, and thus it is possible to achieve the same effects as in the operation control system.

An operation control method according to an aspect of the invention is performed by a wearable apparatus mounted with a first sensor and mounted on a user, the method including acquiring a measurement result in a second sensor from a measurement apparatus which is configured separately from the wearable apparatus and is mounted with the second sensor; and controlling a predetermined operation on the basis of the acquired measurement result in the second sensor, and a measurement result in the first sensor.

According to the aspect of the invention, the wearable apparatus used in combination with the measurement apparatus performs the operation control method, and thus it is possible to achieve the same effects as in the operation control system or the wearable apparatus.

An operation control program according to an aspect of the invention is executed by a wearable apparatus mounted with a first sensor and mounted on a user, the program causing the wearable apparatus to execute acquiring a measurement result in a second sensor from a measurement apparatus which is configured separately from the wearable apparatus and is mounted with the second sensor; and controlling a predetermined operation on the basis of the acquired measurement result in the second sensor, and a measurement result in the first sensor.

According to the aspect of the invention, the wearable apparatus used in combination with the measurement apparatus executes the operation control program, and thus it is possible to achieve the same effects as in the operation control system or the wearable apparatus.

BRIEF DESCRIPTION OF THE DRAWINGS

The invention will be described with reference to the accompanying drawings, wherein like numbers reference like elements.

DESCRIPTION OF EXEMPLARY EMBODIMENTS

First Embodiment

Hereinafter, a first embodiment of the invention will be described with reference to the drawings.

Configuration of Operation Control System

Figure 1:
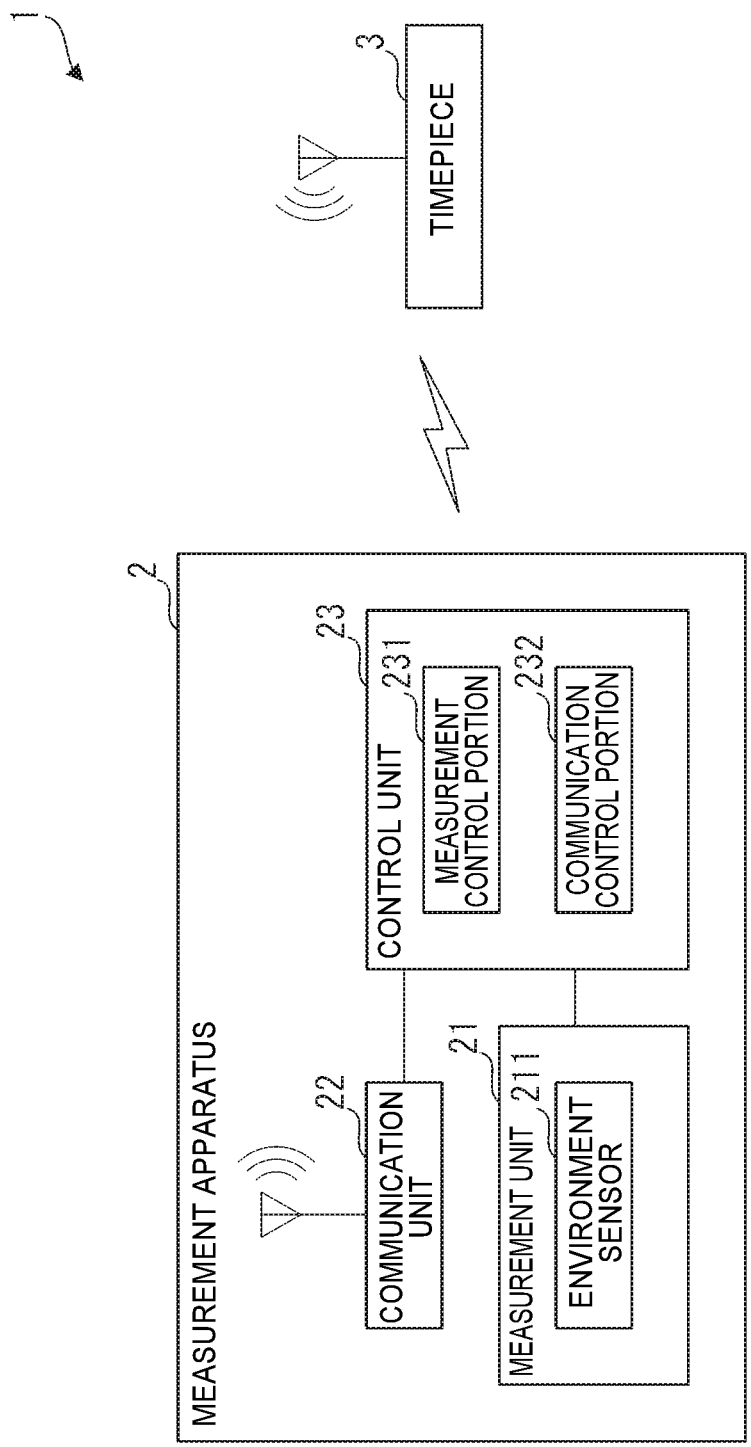
FIG. 1 is a schematic diagram illustrating a configuration of an operation control system according to a first embodiment of the invention.

FIG. 1 is a schematic diagram illustrating a configuration of an operation control system 1 according to the present embodiment.

The operation control system 1 according to the present embodiment includes, as illustrated in FIG. 1, a measurement apparatus 2 as an external apparatus and a timepiece 3 as a wearable apparatus, which can perform communication with each other. The operation control system 1 has one of the features in that the timepiece 3 controls a preset operation on the basis of a measurement result in the measurement apparatus 2 and a detection result in the timepiece 3.

Hereinafter, each constituent element of the operation control system 1 will be described.

Configuration of Measurement Apparatus

The measurement apparatus 2 is configured to be portable by a user, and detects and measures information (environmental information) regarding a surrounding environment of the measurement apparatus 2. In the present embodiment, since an environment sensor 211 which will be described later is formed as a temperature sensor, the measurement apparatus 2 measures a temperature which is an index of the surrounding environment of the measurement apparatus 2. As illustrated in FIG. 1, the measurement apparatus 2 includes a measurement unit 21, a communication unit 22, and a control unit 23.

The term "portable" in the measurement apparatus 2 includes not only a case where the measurement apparatus 2 can be directly mounted on a user but also a case where the measurement apparatus 2 is attachable to an object mounted on or carried by the user. Particularly, in the present embodiment, the measurement apparatus 2 measures ultraviolet information, and thus at least a part thereof is preferably exposed to the outside.

The measurement unit 21 is configured to include the environment sensor 211 which is mounted on the measurement apparatus 2 and measures the environmental information. The environment sensor 211 corresponds to a second sensor according to the invention, and is formed of an ultraviolet sensor measuring an ultraviolet intensity in the present embodiment. The measurement unit 21 outputs a measurement signal indicating a measurement result in the environment sensor 211 to the control unit 23. Taking into consideration a case where the timepiece 3 which will be described later measures environmental information, environmental information measured by the measurement apparatus 2 will be referred to as measurement apparatus side environmental information so as to be differentiated therefrom.

The communication unit 22 performs communication with the timepiece 3 which is an external apparatus of the measurement apparatus 2, and transmits and receives information to and from the timepiece 3. The communication unit 22 may be formed of a communication module which can perform communication with an external apparatus according to a communication method based on a short-range radio communication standard such as IEEE802.15 or a communication method based on a communication standard IEEE802.16 and Long Term Evolution (LTE). The former communication method may include Bluetooth (registered trademark), and, in the present embodiment, communication between the communication unit 22 and the timepiece 3 is performed according to Bluetooth.

The control unit 23 is configured to include a control circuit such as a central processing unit (CPU), and controls an operation of the entire measurement apparatus 2. The control unit 23 includes a measurement control portion 231 and a communication control portion 232.

The measurement control portion 231 controls an operation of the measurement unit 21. The measurement control portion 231 causes the measurement unit 21 to measure the environmental information (in the present embodiment, an ultraviolet intensity).

The communication control portion 232 controls the communication unit 22 to establish communication with the timepiece 3, and acquires request information received from the timepiece 3 via the communication unit 22. If the request information is acquired, the communication control portion 232 causes the measurement control portion 231 to control the measurement unit 21 in order to measure the environmental information, and transmits obtained environmental information (measurement apparatus side environmental information) to the timepiece 3.

Configuration of Timepiece

Figure 2:
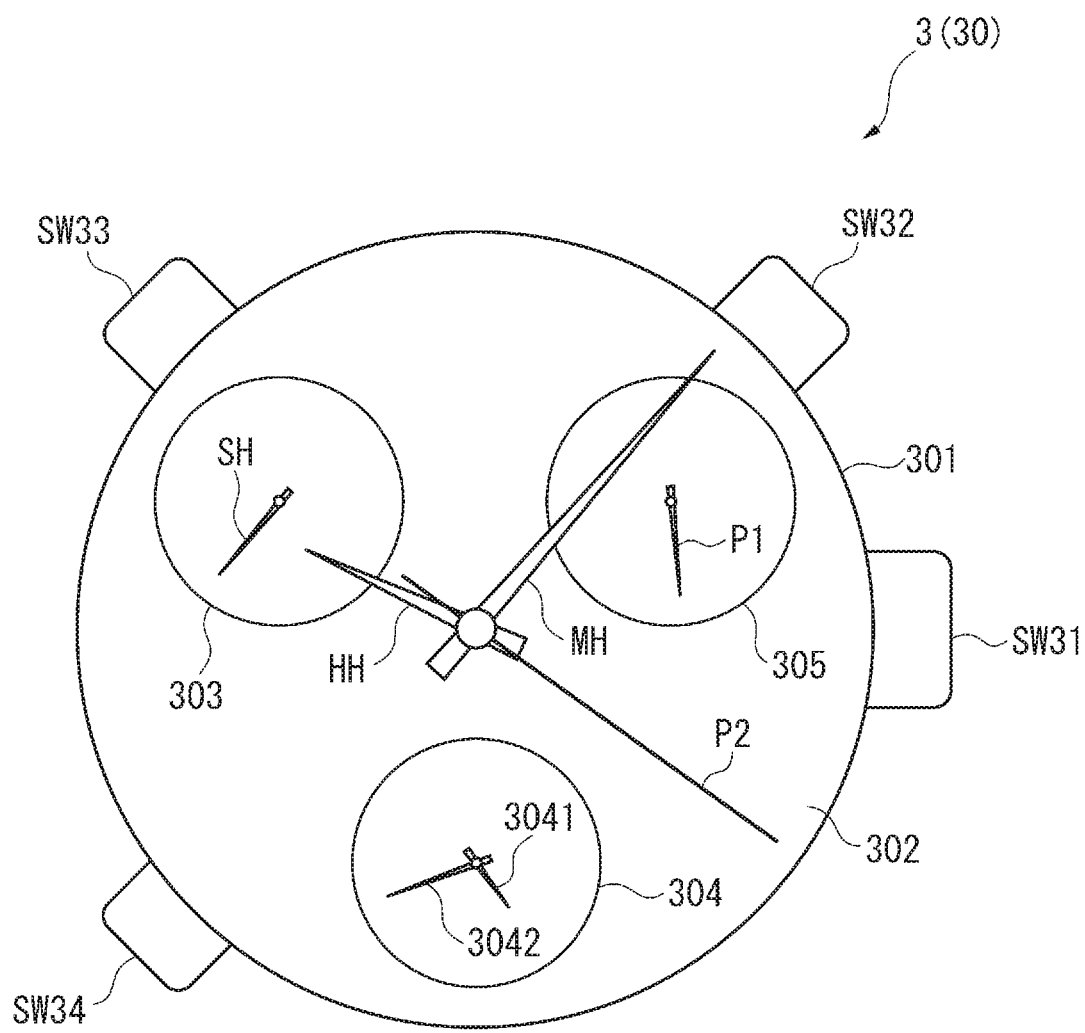
FIG. 2 is a schematic diagram illustrating a configuration of a timepiece according to the first embodiment.

FIG. 2 is a schematic diagram illustrating a configuration of the timepiece 3.

As described above, the timepiece 3 is a wearable apparatus which is mounted on or carried by a user, and is used. The timepiece 3 displays the time, and also controls a predetermined operation on the basis of environmental information acquired from the measurement apparatus 2 and a measurement result in an internal sensor 371 (refer to FIG. 3) of the timepiece 3. Specifically, in the present embodiment, the timepiece 3 controls electric wave reception on the basis of a measurement result of an ultraviolet intensity included in the measurement apparatus side environmental information and a measurement result of illuminance in the internal sensor 371, and also controls power consumption.

As illustrated in FIG. 2, the timepiece 3 includes a timepiece main body 30 and a band BN used to mount the timepiece main body 30 on the body (for example, the wrist) of the user.

The timepiece main body 30 includes a casing 301 which is a substantially circular shape in a front view, a circular dial 302 provided in the casing 301, an hour hand HH, a minute hand MH, a second hand SH, small windows 303 to 305, a pointer P1, a function hand P2, and switches SW31 to SW34.

The hour hand HH and the minute hand MH are rotatably provided such that the respective rotation axes thereof are the same as each other substantially at the center of the dial 302. The second hand SH is rotatably provided in the small window 303 disposed substantially in the ten o'clock direction in the dial 302. Rotation of the hour hand HH, the minute hand MH, and the second hand SH is controlled by a display control portion 392 (refer to FIG. 4) which will be described later.

The small window 304 is disposed substantially in the six o'clock direction in the dial 302. A mode display hand 3041 and a battery residual quantity display hand 3042 are rotatably disposed in the small window 304 such that the respective rotation axes thereof are the same as each other. Rotation of the hands 3041 and 3042 is controlled by the display control portion 392.

The small window 305 is disposed substantially in the two o'clock direction in the dial 302. The pointer P1 is rotatably disposed in the small window 305. The function hand P2 is rotatably disposed in the dial 302 such that a rotation axis thereof is the same as those of the hour hand HH and the minute hand MH. Rotation of the pointer P1 and the function hand P2 is controlled by the display control portion 392.

The switches SW31 to SW34 are provided to be able to project and recede on a side surface of the casing 301. The switches SW31 to SW34 are pressed when the user causes the timepiece 3 to perform a predetermined operation, and output operation signals corresponding to the switches to a control unit 39 which will be described later.

Specifically, the switch SW31 is located in the three o'clock direction in the casing 301, and the switch SW32 is located in the two o'clock direction in the casing 301. The switch SW33 is located in the ten o'clock direction in the casing 301, and the switch SW34 is located in the eight o'clock direction in the casing 301. Among the switches, the switch SW33 is a switch pressed when time correction is performed.

Internal Configuration of Timepiece

Figure 3:
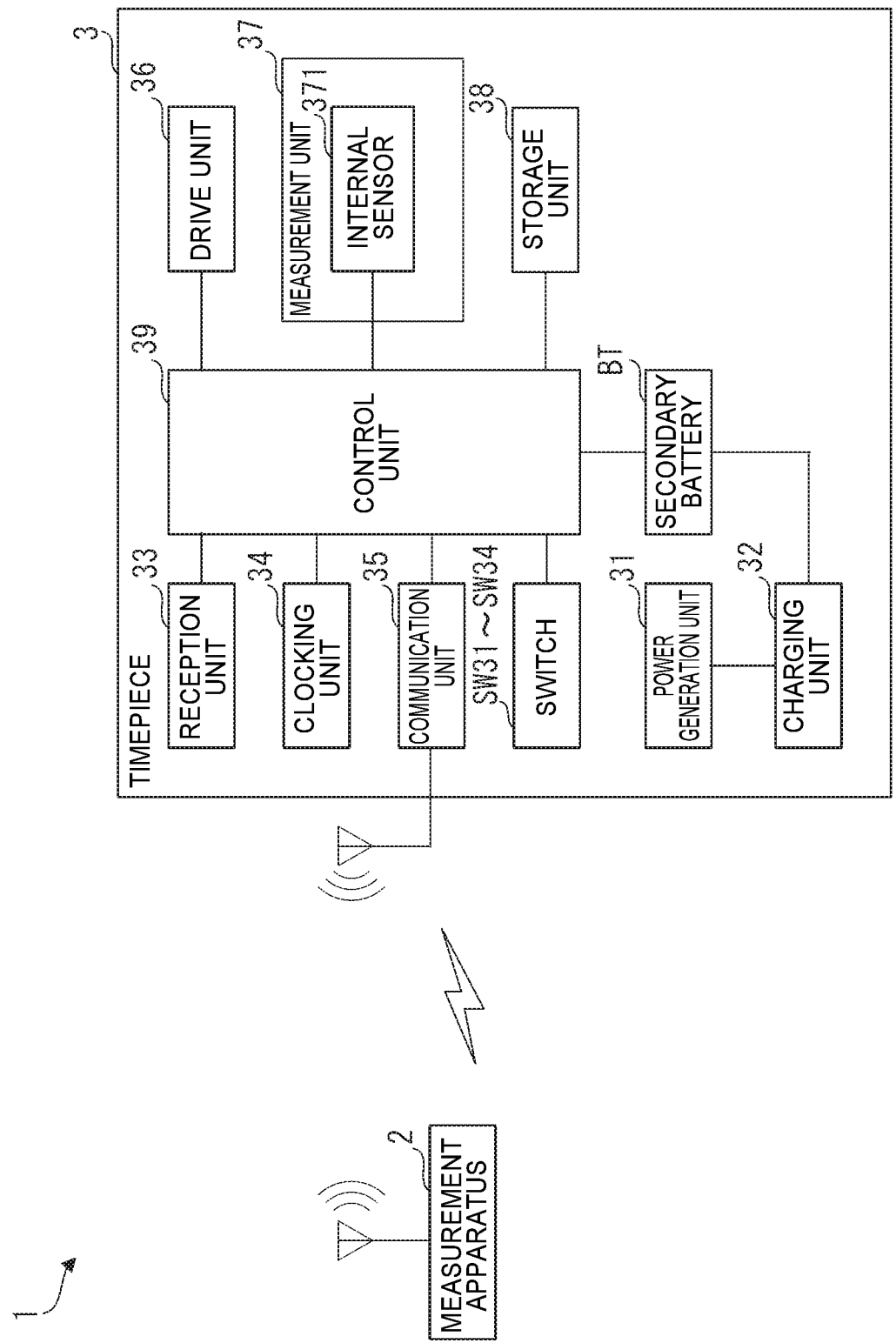
FIG. 3 is a block diagram illustrating a configuration of the timepiece according to the first embodiment.

FIG. 3 is a block diagram illustrating a configuration of the timepiece 3.

In addition to the above-described configuration, as illustrated in FIG. 3, the timepiece 3 includes a power generation unit 31, a charging unit 32, a secondary battery BT, a reception unit 33, a clocking unit 34, a communication unit 35, a drive unit 36, a measurement unit 37, a storage unit 38, and the control unit 39.

The power generation unit 31 is configured to include a solar cell plate provided with a plurality of solar cells (photovoltaic elements) which convert light energy into electrical energy (power). However, any other configuration may be used, and there may be a configuration in which the power generation unit 31 generates power as a result of a rotation weight rotating.

The charging unit 32 charges the secondary battery BT by using power generated by the power generation unit 31. The charging unit 32 may charge the secondary battery BT by using power supplied from the outside.

The secondary battery BT supplies drive power to the entire timepiece 3.

The reception unit 33 receives date-and-time information included in a satellite signal such as a global positioning system (GPS) signal or a standard electric wave under the control of the control unit 39. In the present embodiment, the reception unit 33 acquires the date-and-time information by receiving the satellite signal.

The clocking unit 34 measures the present date and time. The present date and time are corrected by the control unit 39 on the basis of date-and-time information acquired by the reception unit 33.

The communication unit 35 performs communication with the measurement apparatus 2 under the control of the control unit 39, and receives the measurement apparatus side environmental information from the measurement apparatus 2. The communication unit 35 may have the same configuration as that of the communication unit 22.

The drive unit 36 rotates (moves) the hands HH, MH, SH, 4041, 4042, P1 and P2 under the control of the control unit 39. In the present embodiment, the drive unit 36 is provided according to each hand, and is configured to include stepping motors which are driven according to pulse signals which are input from the control unit 39. However, any other configuration may be used, and there may be a configuration in which the drive unit 36 includes an actuator such as a piezoelectric element.

The measurement unit 37 includes the internal sensor 371 built into the timepiece 3, and measures environmental information regarding a surrounding environment of the timepiece 3 (and also the user), and user information including at least one of biological information and body motion information of the user, by using the internal sensor 371. The internal sensor 371 corresponds to a first sensor according to the invention, and is formed as an illuminance sensor measuring the illuminance as environmental information included in user information in the present embodiment. The internal sensor 371 is not limited to a configuration in which the whole thereof is accommodated in the casing 301, and a part thereof may be exposed out of the casing 301. In other words, the internal sensor 371 may be mounted on the timepiece 3, including a case of being externally attached to the timepiece 3.

The storage unit 38 is formed of a nonvolatile memory such as a flash memory, and stores various program or data required in an operation of the timepiece 3. As such programs, the storage unit 38 stores, for example, an operation control program for the timepiece 3 performing an operation control process which will be described later.

Figure 4:
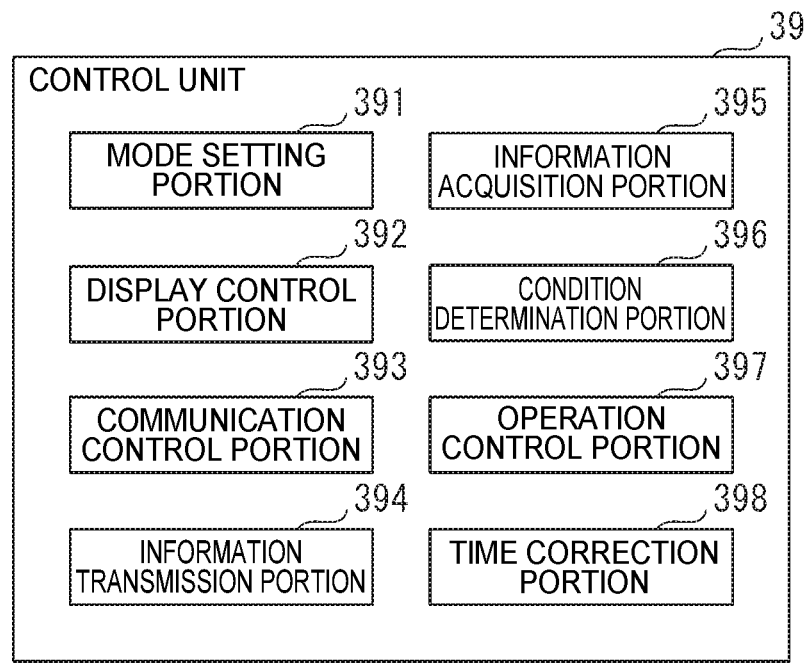
FIG. 4 is a block diagram illustrating a configuration of a control unit provided in the timepiece according to the first embodiment.

FIG. 4 is a block diagram illustrating a configuration of the control unit 39.

The control unit 39 is configured to include a control circuit, and controls an operation of the entire timepiece 3. For example, the control unit 39 performs processes corresponding to operation signals which are input in response to pressing of the switches SW31 to SW34. When the present date and time are corrected, the control unit 39 determines whether or not the satellite signal can be received on the basis of the measurement apparatus side environmental information acquired from the measurement apparatus 2 and the user information measured by the measurement unit 37, and receives the satellite signal and also corrects the present date and time in a case where it is determined the satellite signal can be received.

The control unit 39 executes a program stored in the storage unit 38 so as to realize functional portions such as a mode setting portion 391, the display control portion 392, a communication control portion 393, an information transmission portion 394, an information acquisition portion 395, a condition determination portion 396, an operation control portion 397, and a time correction portion 398, as illustrated in FIG. 4.

If a control signal is input from the switch SW34, the mode setting portion 391 sets an operation mode of the timepiece 3. Such an operation mode may include, for example, an apparatus inside mode of stopping communication with external apparatuses, and a chronograph mode of making a stopwatch function valid. The present operation mode is indicated by the mode display hand 3041 (refer to FIG. 2).

The display control portion 392 controls an operation of the drive unit 36, and thus rotates the hands HH, MH, SH, 3041, 3042, P1 and P2.

Specifically, the display control portion 392 rotates the hour hand HH, the minute hand MH, and the second hand SH according to the present date and time measured by the clocking unit 34.

The display control portion 392 causes the hands 3041 and 3042 to indicate a state of the timepiece 3. Specifically, the display control portion 392 rotates the mode display hand 3041 to indicate the present operation mode, and also rotates the battery residual quantity display hand 3042 to indicate a battery residual quantity of the secondary battery BT. The battery residual quantity may be detected on the basis of a voltage of drive power supplied from the secondary battery BT.

In a case where measurement apparatus side environmental information acquired from the measurement apparatus 2 is displayed, the display control portion 392 rotates the pointer P1 to indicate the measurement apparatus side environmental information. In the present embodiment, the measurement apparatus side environmental information includes the ultraviolet intensity, and thus the pointer P1 indicates the ultraviolet intensity. The pointer P1 may indicate a numerical value of a UV index calculated on the basis of the ultraviolet intensity. The UV index is an index obtained by using integer values of 1 to 11 and "11+" indicating values of 11 or greater as the intensity of ultraviolet rays in order to easily understand the extent of the influence which the ultraviolet rays have on a human body.

In a case where user information (illuminance) measured by the internal sensor 371 of the measurement unit 37 is displayed, the display control portion 392 rotates the function hand P2 to indicate the user information.

Indication of measurement apparatus side environmental information using the pointer P1 and indication of user information using the function hand P2 may not be performed.

The communication control portion 393 controls communication with an external apparatus using the communication unit 35. For example, the communication control portion 393 establishes communication with the measurement apparatus 2 using the communication unit 35, and stores connection information with the measurement apparatus 2 in the storage unit 38. The communication control portion 393 causes various pieces of information to be transmitted and received between the measurement apparatus 2 and the communication unit 35 on the basis of the connection information.

The information transmission portion 394 transmits request information for making a request for the measurement apparatus side environmental information to the measurement apparatus 2 via the communication unit 35 under the control of the operation control portion 397 which will be described later. The information transmission portion 394 also transmits the request information to the measurement apparatus 2 via the communication unit 35 under the control of the operation control portion 397 in a case where the correction process is performed every predetermined time or a case where the correction process is performed at a regular time set in advance.

The information acquisition portion 395 causes the communication unit 35 to receive measurement apparatus side environmental information transmitted from the measurement apparatus 2 having received the request information, and thus acquires the environmental information.

The condition determination portion 396 determines whether or not a predetermined operation can be performed on the basis of measurement apparatus side environmental information acquired by the information acquisition portion 395 and user information which is a measurement result in the measurement unit 37. In the present embodiment, as the predetermined operation, the condition determination portion 396 determines whether or not a satellite signal can be received by the reception unit 33, and thus determines whether or not the reception can be performed.

For example, in a case where the ultraviolet intensity included in the measurement apparatus side environmental information is high, and the illuminance included in the user information measured by the measurement unit 37 is high, there is a high probability that the timepiece 3 may be located in a place (for example, outdoors) in which the satellite signal can be received. In this case, the condition determination portion 396 determines that the satellite signal can be received.

In a case where the ultraviolet intensity is high, and the illuminance is low, the timepiece 3 may be covered with the sleeve of clothes or the like, but there is a high probability that the timepiece 3 may be located in a place in which the satellite signal can be received. In this case, the condition determination portion 396 determines that the satellite signal can be received.

On the other hand, in a case where the ultraviolet intensity is low, and the illuminance is high, ultraviolet rays may be cut by a window or the like, but there is a high probability that the timepiece 3 may be located in a place (for example, by a window) in which the satellite signal can be received. In this case, the condition determination portion 396 determines that the satellite signal can be received.

In contrast, in a case where the ultraviolet intensity is low, and the illuminance is low, there is a high probability that the timepiece 3 may be located in a place (for example, indoors) in which the satellite signal cannot be received. In this case, the condition determination portion 396 determines that the satellite signal cannot be received.

The operation control portion 397 controls an operation of the timepiece 3.

For example, if an operation signal is input from the switch SW32, the operation control portion 397 causes the information transmission portion 394 to transmit the request information in order to perform a correction process on the present date and time measured by the clocking unit 34. Thereafter, the operation control portion 397 causes the condition determination portion 396 to perform the determination process on the basis of the measurement apparatus side environmental information and the user information.

In a case where the condition determination portion 396 determines that the predetermined operation can be performed, the operation control portion 397 causes the predetermined operation to be performed. In a case where the condition determination portion 396 determines that the predetermined operation cannot be performed, the operation control portion 397 does not cause the predetermined operation to be performed. In other words, in the present embodiment, in a case where the condition determination portion 396 determines that a satellite signal can be received, the operation control portion 397 causes the reception unit 33 to receive the satellite signal, and, in a case where the condition determination portion 396 determines that the satellite signal can not be received, the operation control portion 397 terminates the process without causing the reception unit 33 to receive the satellite signal.

The time correction portion 398 corrects the present date and time measured by the clocking unit 34 on the basis of date-and-time information included in a satellite signal received by the reception unit 33.

Operation Control Process in Operation Control System

Figure 5:
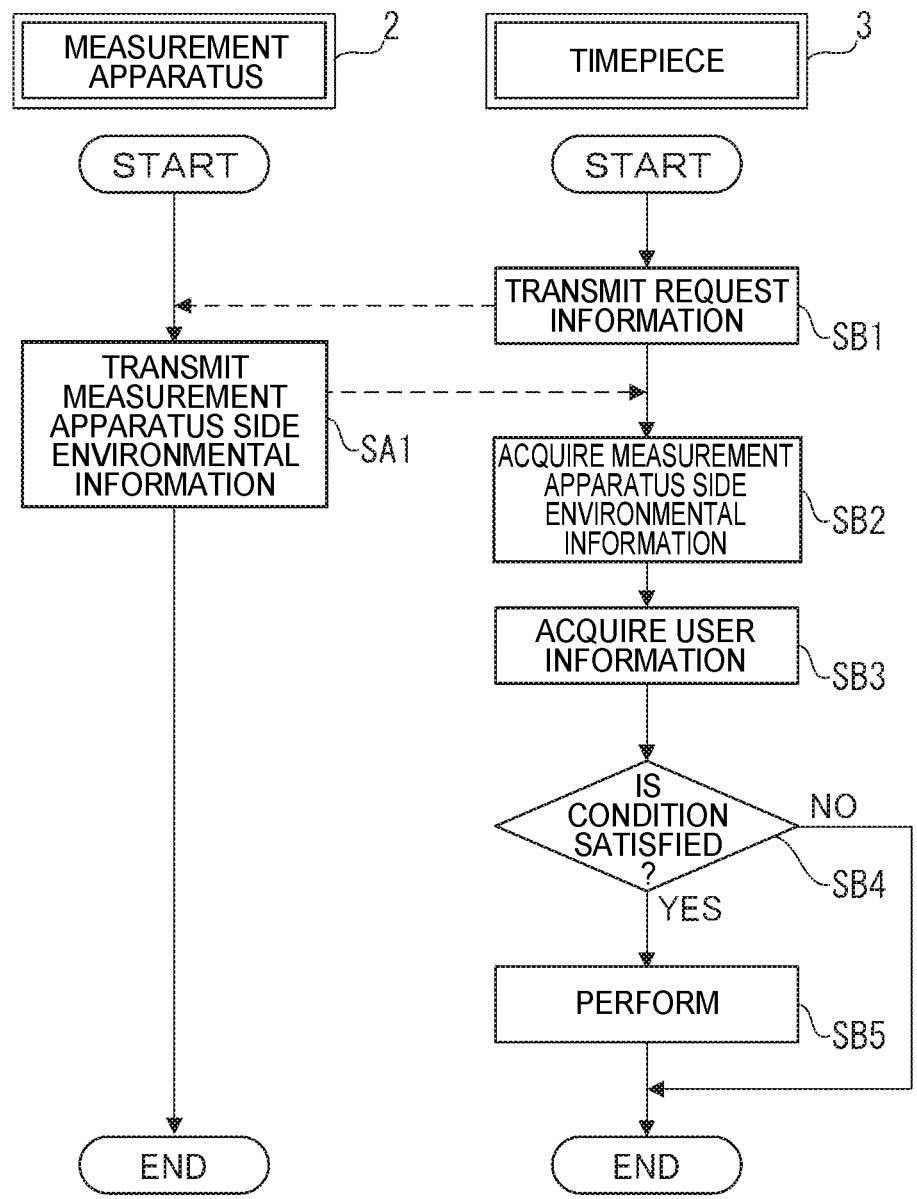
FIG. 5 is a flowchart illustrating an operation control process according to the first embodiment.

FIG. 5 is a flowchart illustrating operation control processes performed by the measurement apparatus 2 and the timepiece 3 of the operation control system 1.

In the operation control system 1, when the predetermined operation is performed, the control unit 39 of the timepiece 3 executes the operation control program stored in the storage unit 38 so as to perform the following operation control processes. In the present embodiment, as described above, in a case where an operation signal is input from the switch SW33 for performing time correction, or a case where the time to perform the time correction comes, the operation control processes are performed in order to perform a time correction process.

In the operation control processes, as illustrated in FIG. 5, first, the information transmission portion 394 of the control unit 39 transmits request information to the measurement apparatus 2 (step SB1).

The measurement apparatus 2 having received the request information transmits measurement apparatus side environmental information based on a measurement result in the measurement unit 21 to the timepiece 3 (step SA1).

If the measurement apparatus side environmental information is received by the communication unit 35, the information acquisition portion 395 acquires the measurement apparatus side environmental information (step SB2).

Next, the condition determination portion 396 acquires user information which is a measurement result in the measurement unit 37 (step SB3), and performs the determination process on the basis of the user information and the measurement apparatus side environmental information, so as to determine whether or not the predetermined operation can be performed, that is, a satellite signal can be received (step SB4).

In a case where it is determined that the predetermined operation (reception of a satellite signal) cannot be performed in the determination process in step SB4 (NO in step SB4), the operation control portion 397 terminates the process without causing the predetermined operation to be performed.

On the other hand, in a case where it is determined that the predetermined operation (reception of a satellite signal) can be performed in the determination process in step SB4 (YES in step SB4), the operation control portion 397 causes the predetermined operation to be performed (step SB5). In other words, the operation control portion 397 causes the reception unit 33 to receive a satellite signal, and causes the time correction portion 398 to correct the present date and time on the basis of acquired date-and-time information.

The operation control processes are completed through the above steps. Steps SB1 and SB2 and step SB3 may be reversed in an execution order thereof, and may be performed simultaneously.

As mentioned above, only in a case where a satellite signal can be received, the operation control portion 397 causes the reception unit 33 to receive the satellite signal, and thus it is possible to reduce power consumption.

Effects of First Embodiment

According to the operation control system 1 of the present embodiment described above, it is possible to achieve the following effects.

The control unit 39 of the timepiece 3 which is a wearable apparatus controls electric wave reception as the predetermined operation on the basis of not only a measurement result of illuminance in the internal sensor 371 as a first sensor built into the timepiece 3 but also a measurement result of an ultraviolet intensity in the environment sensor 211 as a second sensor, acquired from the measurement apparatus 2. Consequently, the measurement apparatus 2 which is formed separately from the timepiece 3 can measure an ultraviolet intensity which cannot be measured by the internal sensor 371 measuring illuminance. Since measurement positions (measurement points) of the ultraviolet intensity and the illuminance can be made different from each other, even in a case where one sensor hardly performs measurement, a measurement result in one sensor can be complemented by a measurement result in the other sensor. Therefore, as described above, it is possible to improve the accuracy of determination of whether or not an electric wave can be received. Therefore, the electric wave can be received when the electric wave is easily received, and thus it is possible to increase a possibility that the electric wave can be appropriately received.

The timepiece 3 includes the reception unit 33 which receives an electric wave such as a satellite signal or a standard electric wave transmitted from the outside, and the operation control portion 397 controls electric wave reception in the reception unit 33. Consequently, it is possible to perform control such that the electric wave is received in a case where the electric wave can be favorably received, and the electric wave is not received in a case where the electric wave is hard to receive, on the basis of measurement results in the environment sensor 211 and the internal sensor 371. Therefore, it is possible to increase a probability that an electric wave can be received correctly, and also to suppress useless power consumption since an electric wave is not received in a case where the electric wave is hard to receive.

The internal sensor 371 as a first sensor measures illuminance which is an index indicating a surrounding environment of the timepiece 3, and the environment sensor 211 as a second sensor measures an ultraviolet intensity which is an index indicating a surrounding environment of the measurement apparatus 2. Consequently, it is possible to reliably improve the accuracy of determination of whether or not an electric wave can be received according to surrounding environments of the measurement apparatus 2 and the timepiece 3. Therefore, it is possible to increase a possibility that an electric wave can be appropriately received.

Second Embodiment

Next, a second embodiment of the invention will be described.

An operation control system according to the present embodiment includes a pulsimeter which is a wearable apparatus instead of the timepiece 3, and each of a measurement apparatus and the pulsimeter is configured to measure a plurality of measurement items. In relation to this fact, the operation control system of the present embodiment is different from the operation control system 1. In the following description, the same constituent elements or substantially the same constituent elements as those described above are given the same reference numerals, and description thereof will be omitted.

Schematic Configuration of Operation Control System

Figure 6:
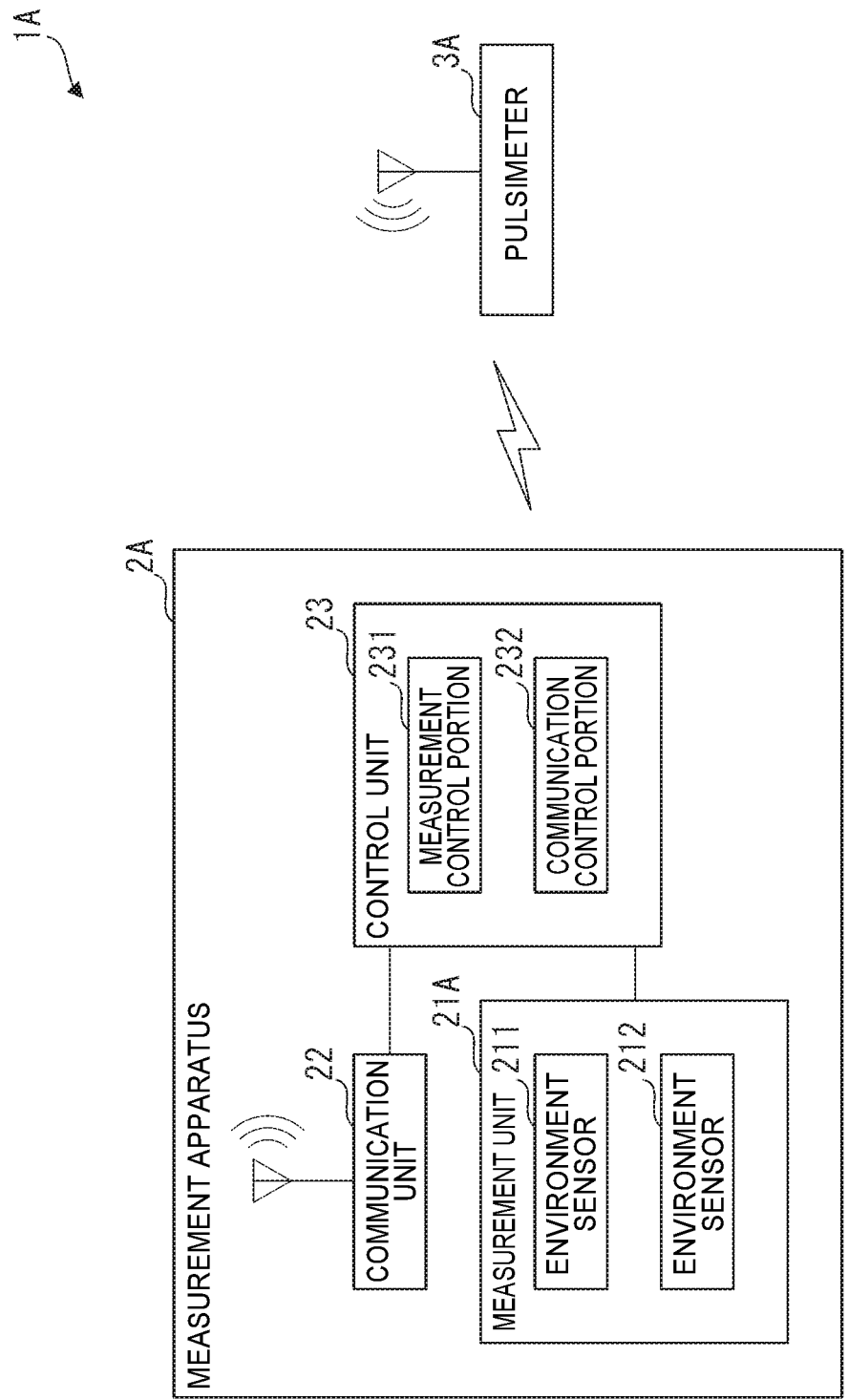
FIG. 6 is a block diagram illustrating a configuration of an operation control system according to a second embodiment of the invention.

FIG. 6 is a block diagram illustrating a configuration of an operation control system 1A according to the present embodiment.

The operation control system 1A according to the present embodiment includes, as illustrated in FIG. 6, a measurement apparatus 2A and a pulsimeter 3A which is a wearable apparatus, which can perform communication with each other. In the same manner as the operation control system 1, the operation control system 1A has one of the features in that an operation of the pulsimeter 3A is controlled on the basis of measurement apparatus side environmental information measured by the measurement apparatus 2A and user information measured by the pulsimeter 3A.

Hereinafter, each constituent element of the operation control system 1A will be described.

Configuration of Measurement Apparatus

The measurement apparatus 2A detects and measures environmental information regarding a surrounding environment of the measurement apparatus 2 similarly to the measurement apparatus 2. As illustrated in FIG. 6, the measurement apparatus 2A has the same configuration and function as those of the measurement apparatus 2 except that a measurement unit 21A is provided instead of the measurement unit 21.

The measurement unit 21A includes two environment sensors 211 and 212 corresponding to second sensors, and different pieces of environmental information are measured by the environment sensors 211 and 212. In the present embodiment, the environment sensor 211 is formed of an ultraviolet sensor detecting an ultraviolet intensity, and the environment sensor 212 is formed of an illuminance sensor detecting illuminance. The measurement unit 21A outputs measurement results in the environment sensors 211 and 212 to the control unit 23.

In a case where request information is received from the pulsimeter 3A, the control unit 23 of the measurement apparatus 2A transmits measurement apparatus side environmental information including measurement results of an ultraviolet intensity and illuminance in the measurement unit 21A to the pulsimeter 3A via the communication unit 22. The control unit 23 may transmit measurement apparatus side environmental information at a predetermined interval. A transmission interval in this case may be, for example, a five-minute interval, but may be changed as appropriate according to power consumption in the measurement apparatus 2A.

Configuration of Pulsimeter

Figure 7:
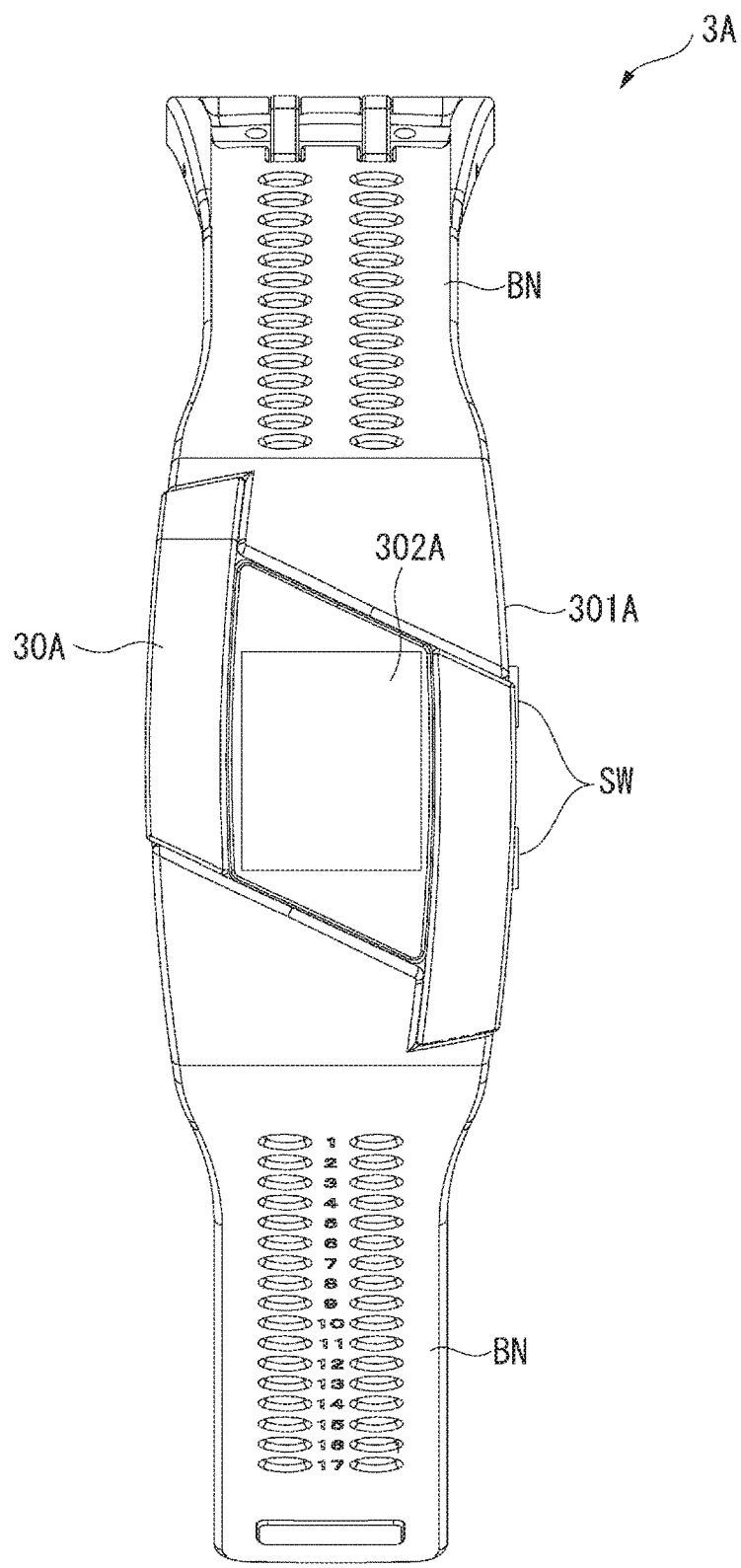
FIG. 7 is a diagram illustrating an exterior of a pulsimeter according to the second embodiment.

FIG. 7 is a diagram illustrating an exterior of the pulsimeter 3A.

The pulsimeter 3A is a wearable apparatus which is mounted on a user and is used as described above, and measures and records biological information (for example, a pulse rate) and body motion information (for example, the number of steps) of the user. The pulsimeter 3A controls a predetermined operation on the basis of measurement apparatus side environmental information acquired from the measurement apparatus 2A and user information indicating measurement results in internal sensors 371 and 372 (refer to 8) of the pulsimeter 3A. Specifically, in the present embodiment, the pulsimeter 3A controls a display state of a display unit 302A on the basis of an ultraviolet intensity and illuminance, and a pulse rate and acceleration, and further controls power consumption.

As illustrated in FIG. 7, the pulsimeter 3A includes an apparatus main body 30A and a band BN.

The apparatus main body 30A includes a casing 301A which is substantially rectangular in a front view, and the display unit 302A and two switches SW provided in the casing 301A.

The display unit 302A is disposed on the front face of the casing 301A. Display content of the display unit 302A is controlled by a control unit 39A which will be described later. For example, the display unit 302A displays the present time, and also displays a measurement result in a measurement unit 37A which will be described later. The display unit 302A is configured to include a liquid crystal panel in the present embodiment, but may be configured to include other variable display panels such as an organic EL panel and an electrophoretic panel.

Each of the two switches SW is input (pressed) when the pulsimeter 3A is caused to perform a predetermined process, and the switches SW output operation signals corresponding to input operations to the control unit 39A.

Figure 8:
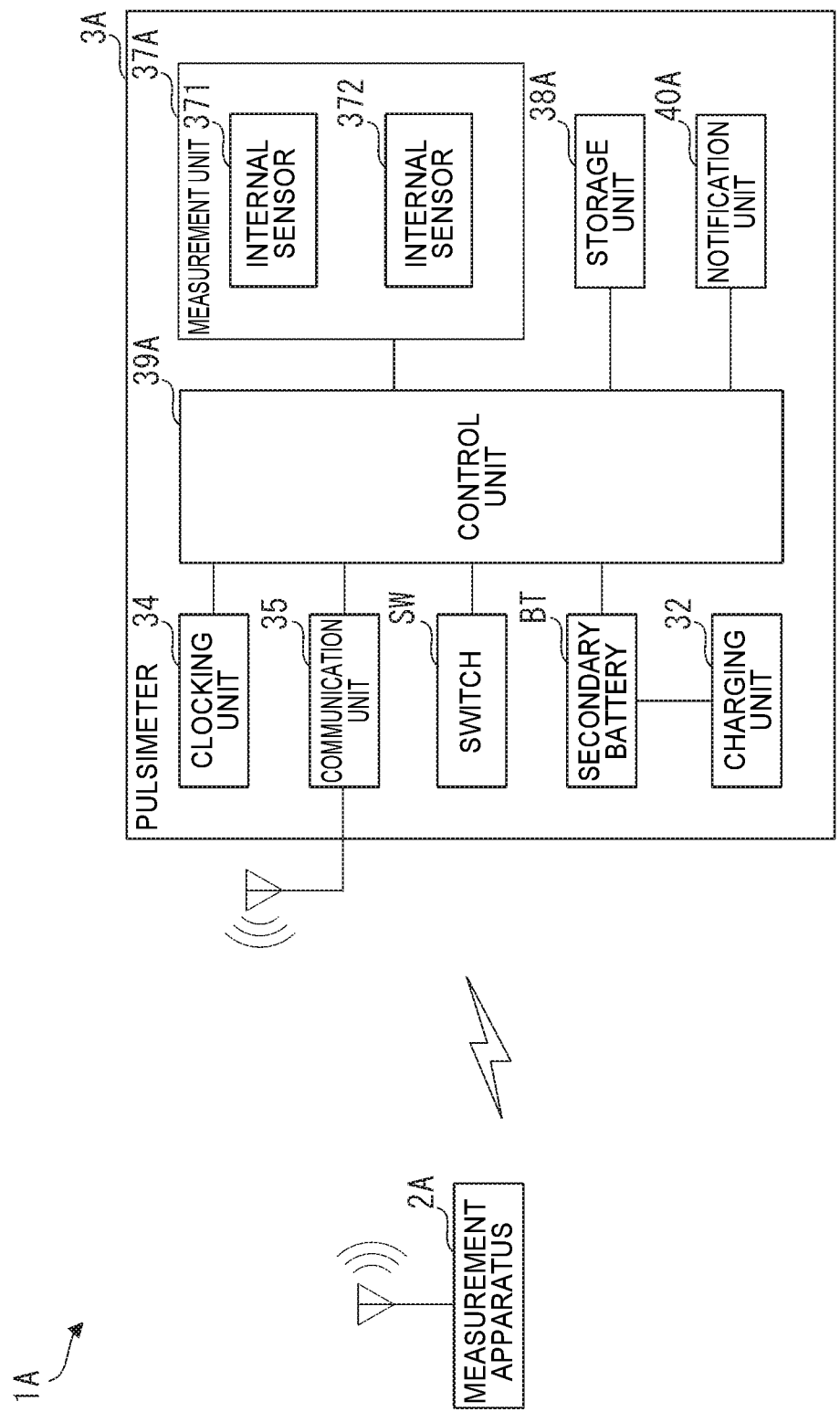
FIG. 8 is a block diagram illustrating a configuration of the pulsimeter according to the second embodiment.

FIG. 8 is a block diagram illustrating a configuration of the pulsimeter 3A.

In addition to the above-described configuration, as illustrated in FIG. 8, the pulsimeter 3A includes a charging unit 32, a secondary battery BT, a clocking unit 34, a communication unit 35, the measurement unit 37A, a storage unit 38A, the control unit 39A, and a notification unit 40A.

Among the units, the charging unit 32 charges the secondary battery BT by using power supplied from the outside, and the secondary battery BT supplies drive power to the pulsimeter 3A. A power generation unit 31 may be provided in the pulsimeter 3A, and the charging unit 32 may charge the secondary battery BT by using power generated by the power generation unit 31.

The notification unit 40A performs a notification of predetermined information. In the present embodiment, the notification unit 40A includes a motor generating vibration and a voice output device outputting voices, and may include either one thereof.

The measurement unit 37A includes two internal sensors 371 and 372 built into the pulsimeter 3A, and measures the user information by using the internal sensors 371 and 372. In the present embodiment, the internal sensor 371 is formed as a pulse wave sensor detecting a pulse wave as biological information of the user included in the user information, and the internal sensor 372 is formed as an acceleration sensor detecting acceleration as body motion information of the user included in the same user information. The measurement unit 37A calculates a pulse rate of the user on the basis of a pulse wave detected by the internal sensor 371, and also calculates the number of steps of the user on the basis of a change in acceleration detected by the internal sensor 372. The pulse rate and the number of steps are displayed on the display unit 302A. As described above, the internal sensors 371 and 372 are not limited to a configuration in which the whole of each thereof is accommodated in the casing 301A, and a part thereof may be exposed out of the casing 301A.

The storage unit 38A is formed of, for example, a nonvolatile memory, and stores various programs or data required in an operation of the pulsimeter 3A. The storage unit 38A stores not only a pulse wave and acceleration detected by the measurement unit 37A but also a pulse rate and the number of steps which are calculated in correlation with the present date and time measured by the clocking unit 34.

Figure 9:
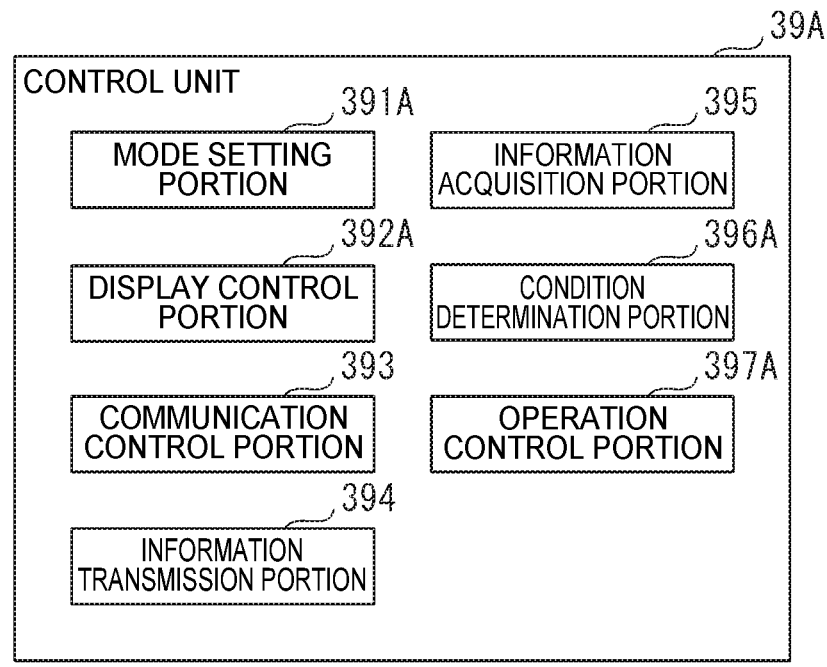
FIG. 9 is a block diagram illustrating a configuration of a control unit provided in the pulsimeter according to the second embodiment.

FIG. 9 is a block diagram illustrating a configuration of the control unit 39A.

The control unit 39A is configured to include a control circuit, and controls an operation of the entire pulsimeter 3A. For example, the control unit 39A performs processes corresponding to operation signals which are input in response to pressing of the switches SW, and measures biological information and body motion information by using the measurement unit 37A. The control unit 39A changes an operation mode or performs a notification operation on the basis of the measurement apparatus side environmental information acquired from the measurement apparatus 2A and the user information measured by the measurement unit 37A.

The control unit 39A executes a program stored in the storage unit 38A so as to realize functional portions such as a mode setting portion 391A, a display control portion 392A, a communication control portion 393, an information transmission portion 394, an information acquisition portion 395, a condition determination portion 396A, and an operation control portion 397A, as illustrated in FIG. 9.

The mode setting portion 391A sets an operation mode of the pulsimeter 3A. Such an operation mode may include, for example, an apparatus inside mode of stopping communication with external apparatuses, and a power saving mode of reducing power consumption.

The display control portion 392A controls display content of the display unit 302A. Specifically, the display control portion 392A generates an image displayed on the display unit 302A, and outputs the image to the display unit 302A, so as to control the display content of the display unit 302A. In a case where an operation mode is changed to the power saving mode by the mode setting portion 391A, the display control portion 392A can reduce power consumption by not displaying an image on the display unit 302A.

In the same manner as condition determination portion 396, the condition determination portion 396A determines whether or not a predetermined operation can be performed on the basis of measurement apparatus side environmental information acquired by the information acquisition portion 395 after the information transmission portion 394 transmits request information, and user information measured by the measurement unit 37A. In the present embodiment, the condition determination portion 396A determines whether or not a process of changing an operation mode to the power saving mode can be performed on the basis of illuminance included in measurement apparatus side environmental information and a pulse wave and acceleration measured by the measurement unit 37A. The condition determination portion 396A determines whether or not a notification operation for awakening the user can be performed on the basis of an ultraviolet intensity included in the measurement apparatus side environmental information and a pulse wave and acceleration measured by the measurement unit 37A.

For example, the condition determination portion 396A determines whether or not an operation mode can be changed as follows.

It may be determined that the user is relaxed by analyzing a pulse wave measured by the measurement unit 37A. It may be determined that the user is moving by analyzing acceleration measured by the measurement unit 37A.

In a case where the illuminance included in the measurement apparatus side environmental information is less than a predetermined value in a state in which it is determined that the user is relaxed on the basis of the determination results, there is a high probability that the user tries to sleep or is sleeping. In this case, it is considered that there is no problem even in a case where the display unit 302A is in a non-display state. Thus, in this case, the condition determination portion 396A determines that an operation mode can be changed to the power saving mode.

On the other hand, in a case where it is determined that the user is moving on the basis of analysis results of the pulse wave and the acceleration, there is a high probability that the user may be in an awakened state. In a case where the illuminance is high, even if the user is relaxed, there is a high probability that the user may be in an awakened state, for example, since the user may be watching television or a movie. Therefore, in this case, the condition determination portion 396A determines that an operation mode cannot be changed to the power saving mode.

The operation control portion 397A controls an operation of the pulsimeter 3A.

For example, the operation control portion 397A causes the information transmission portion 394 to transmit the request information at a predetermined interval, and also causes the condition determination portion 396A to perform the determination process based on the acquired measurement apparatus side environmental information and user information. In a case where the condition determination portion 396A determines that the predetermined operation can be performed, the operation control portion 397A causes the predetermined operation to be performed. In a case where the condition determination portion 396A determines that the predetermined operation cannot be performed, the operation control portion 397A does not cause the predetermined operation to be performed.

In other words, in a case where the condition determination portion 396A determines that an operation mode can be changed to the power saving mode, the operation control portion 397A causes the mode setting portion 391A to change the present operation mode to the power saving mode. Consequently, the display unit 302A is brought into a non-display state, and thus power consumption can be reduced.

On the other hand, in a case where the condition determination portion 396A determines that an operation mode cannot be changed to the power saving mode, the operation control portion 397A terminates the process without changing an operation mode.

In a case where the condition determination portion 396A determines that the notification operation can be performed, the operation control portion 397A causes the notification unit 40A to perform an awakening notification such as generation of vibration or sounding of an awakening alarm. The operation control portion 397A changes an operation mode to a normal mode along with execution of the notification operation.

On the other hand, in a case where the condition determination portion 396A determines that the notification operation cannot be performed, the operation control portion 397A terminates the process without causing the notification operation to be performed.

Operation Control Process in Operation Control System

The operation mode changing process and the notification operation execution process are performed by the measurement apparatus 2A and the pulsimeter 3A performing the same processes as the above-described operation control processes. In this case, the control unit 39A of the pulsimeter 3A executes the operation control program.

In the operation control system 1A according to the present embodiment, if request information is transmitted from the pulsimeter 3A in step SB1 illustrated in FIG. 5, the measurement apparatus 2A transmits the measurement apparatus side environmental information in the above step SA1.

Next, the pulsimeter 3A receives and acquires the measurement apparatus side environmental information in the above step SB2, and also acquires user information in the above step SB3.

In the above step SB4, the condition determination portion 396A of the pulsimeter 3A determines whether or not an operation mode can be changed (to the power saving mode), and also determines whether or not a notification operation can be performed. If it is determined that one of operation mode changing and the notification operation can be performed, the operation control portion 397A performs a process which can be performed.

If it is determined that either of operation mode changing and the notification operation cannot be performed in the above step SB4, the operation control portion 397A terminates the process without executing step SB5.

Effects of Second Embodiment

According to the operation control system 1A of the present embodiment described above, it is possible to achieve the following effects in addition to the same effects as those in the operation control system 1.

The pulsimeter 3A as a wearable apparatus includes the display unit 302A displaying a pulse rate or the number of steps. The operation control portion 397A changes the present operation mode to the power saving mode on the basis of measurement results of a pulse wave and acceleration in the internal sensors 371 and 372 and a measurement result of illuminance in the environment sensor 212. Consequently, in a case where it is determined that there is no problem in a non-display state of the display unit 302A, it is possible to reduce power consumption by changing the present operation mode to the power saving mode in which the display unit 302A is brought into a non-display mode. The operation control portion 397A performs the notification operation on the basis of measurement results of the pulse wave and acceleration and a measurement result of an ultraviolet intensity in the environment sensor 212. Consequently, it is possible to favorably awaken a user.

The internal sensors 371 and 372 as first sensors measure a pulse wave which is biological information and acceleration which is body motion information of a user (wearer) wearing the pulsimeter 3A, and the environment sensor 212 as a second sensor measures illuminance which is an index indicating a surrounding environment of the measurement apparatus 2A. The environment sensor 211 as a second sensor measures an ultraviolet intensity serving as an index indicating a surrounding environment of the measurement apparatus 2A. Consequently, it is possible to change the operation mode or perform the notification operation according to a surrounding environment of the measurement apparatus 2A and a user's state. Therefore, it is possible to reduce power consumption of the pulsimeter 3A, and also to increase the convenience of the pulsimeter 3A and further the operation control system 1A since a user can be comfortably awakened.

Third Embodiment

Next, a third embodiment of the invention will be described.

An operation control system according to the present embodiment have the same configuration as that of the operation control system 1, but is different from the operation control system 1 in that measurement types of sensors of a measurement apparatus and a timepiece are different from those in the operation control system 1, and the timepiece is a digital timepiece. In the following description, the same constituent elements or substantially the same constituent elements as those described above are given the same reference numerals, and description thereof will be omitted.

Schematic Configuration of Operation Control System

An operation control system according to the present embodiment has the same configuration and function as those of the operation control system 1 except that a timepiece 3B (refer to FIG. 10) is provided instead of the timepiece 3, and a measurement apparatus according to the embodiment has the same configuration and function as those of the measurement apparatus 2 except that the environment sensor 211 of the measurement apparatus 2 measures an ambient temperature of the measurement apparatus 2, and transmits the measured temperature as environmental information (measurement apparatus side environmental information).

Also in the present embodiment, the measurement apparatus 2 may transmit measurement apparatus side environmental information to the timepiece 3B at a predetermined interval regardless of reception of request information.

Configuration of Timepiece

Figure 10:
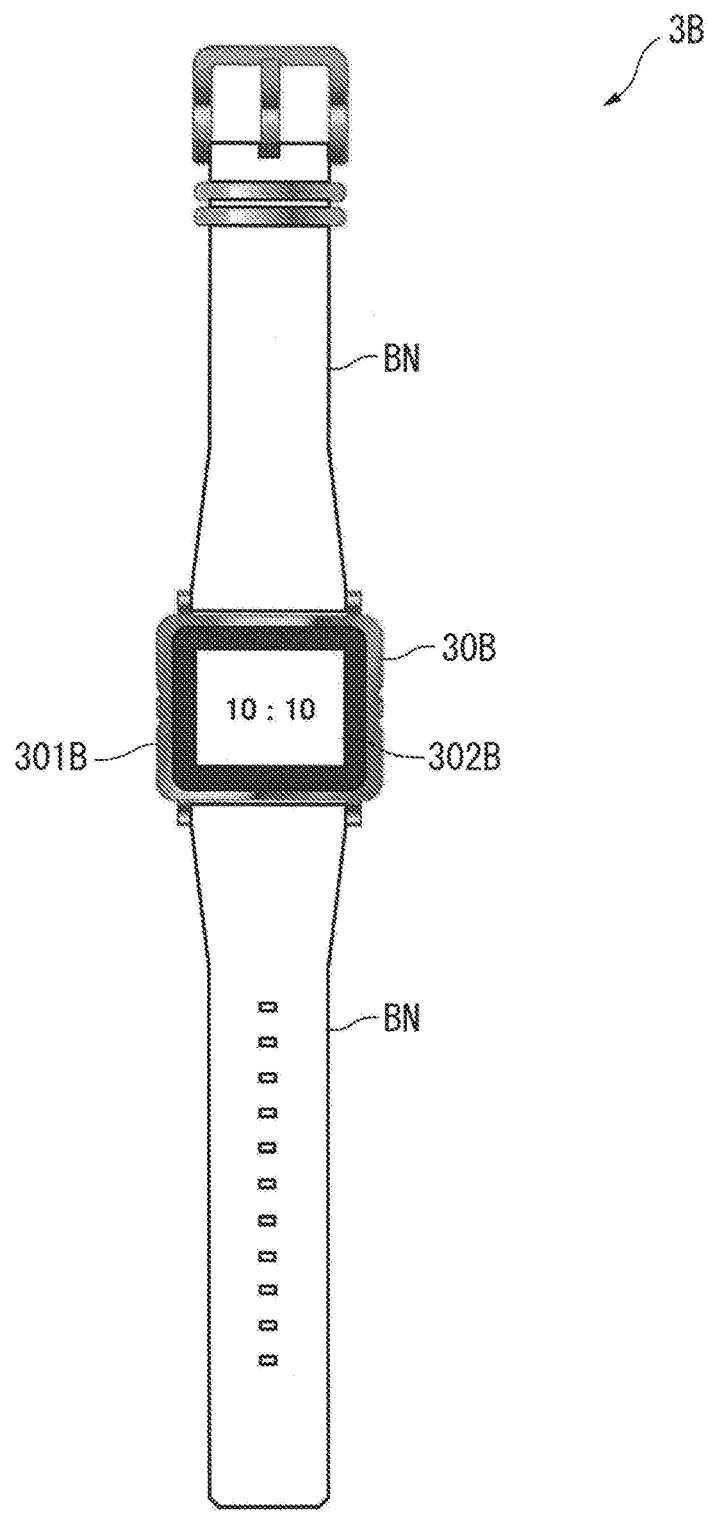
FIG. 10 is a front view illustrating a timepiece of an operation control system according to a third embodiment of the invention.

FIG. 10 is a front view illustrating the timepiece 3B.

The timepiece 3B is formed as a digital timepiece. As will be described later in detail, the timepiece 3B has one of the features in that the content displayed on a display unit 302B differs on the basis of measurement apparatus side environmental information received from the measurement apparatus 2 and user information measured in the timepiece 3B.

As illustrated in FIG. 10, the timepiece 3B has a timepiece main body 30B instead of the timepiece main body 30, and also has a band BN. The timepiece main body 30B includes a substantially rectangular casing 301B, and the display unit 302B provided in the casing 301B.

The display unit 302B displays predetermined information, and is disposed on the front face of the casing 301B. The display unit 302B is formed of a liquid crystal panel or, variable display panels such as an organic EL panel and an electrophoretic panel, and display content thereof is controlled by a control unit 39B which will be described later.

Although not illustrated, the timepiece 3B includes the control unit 39B (refer to FIG. 11) instead of the control unit 39, and has the same configuration and function as those of the timepiece 3 except that the internal sensor 371 is an ultraviolet sensor measuring an ultraviolet intensity as environmental information included in user information.

The charging unit 32 of the timepiece 3B may charge the secondary battery BT by using power supplied from the outside. In this case, the power generation unit 31 may be omitted. A primary battery may be used instead of the secondary battery BT, and, in this case, the charging unit 32 may be omitted.

Figure 11:
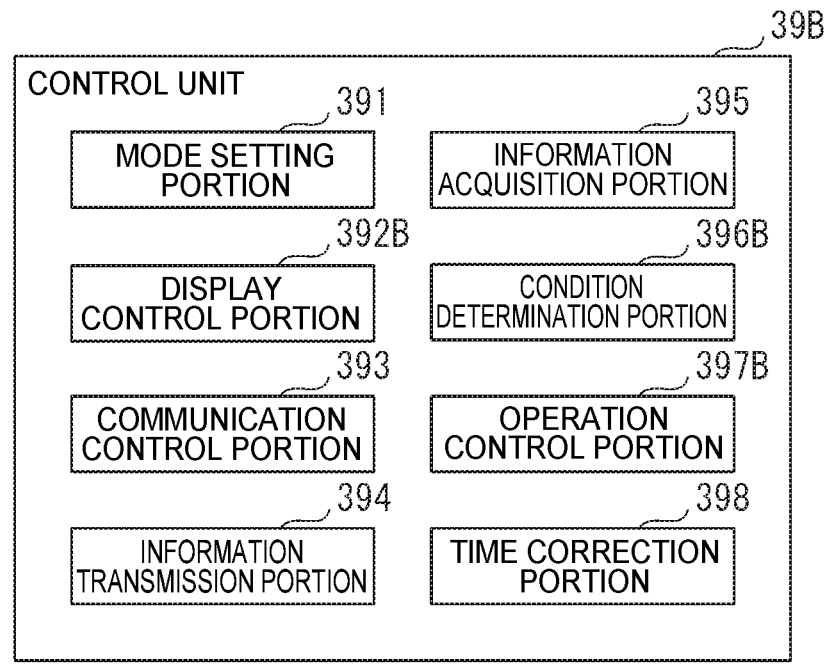
FIG. 11 is a block diagram illustrating a configuration of a control unit provided in the timepiece according to the third embodiment.

FIG. 11 is a block diagram illustrating a configuration of the control unit 39B of the timepiece 3B.

The control unit 39B is configured to include a control circuit, and controls an operation of the timepiece 3B in the same manner as the control unit 39. As illustrated in FIG. 11, the control unit 39B has the same configuration and function as those of the control unit 39 except that a display control portion 392B, a condition determination portion 396B, and an operation control portion 397B are provided instead of the display control portion 392, the condition determination portion 396, and the operation control portion 397.

The display control portion 392B controls display content of the display unit 302B. Specifically, the display control portion 392B generates an image displayed on the display unit 302B, and outputs the image to the display unit 302B, so as to control the display content of the display unit 302B.

In the same manner as the condition determination portion 396, the condition determination portion 396B determines whether or not a predetermined operation can be performed on the basis of the measurement apparatus side environmental information and user information which is a measurement result in the measurement unit 37. In the present embodiment, the condition determination portion 396B determines the display content displayed on the display unit 302B on the basis of a temperature and an ultraviolet intensity.

For example, in a case where a temperature included in measurement apparatus side environmental information is equal to or more than a first threshold value (for example, 30°), and an ultraviolet intensity included in user information is equal to or more than a predetermined value, there is a high probability that a user wearing the measurement apparatus 2 and the timepiece 3B may be located in a relatively hot outdoor place. In this case, the condition determination portion 396B determines that it is necessary to display an image indicating that the user has to pay attention to heat stroke.

In a case where the temperature is equal to or more than the first threshold value, and the ultraviolet intensity is less than the predetermined value, there is a high probability that the user is located in a relatively hot indoor place. In this case, the condition determination portion 396B determines that it is necessary to display an image indicating that the user has to use cooling.

On the other hand, in a case where the temperature is less than a second threshold value (for example, 10°) smaller than the first threshold value, and the ultraviolet intensity is equal to or more than the predetermined value, there is a high probability that the user may be located in a relatively cold outdoor place. In this case, the condition determination portion 396B determines that it is necessary to display an image indicating that the user has to pay attention to the cold.

In a case where the temperature is less than the second threshold value, and the ultraviolet intensity is less than the predetermined value, there is a high probability that the user may be located in a relatively cold indoor place. In this case, the condition determination portion 396B determines that it is necessary to display an image indicating that the user has to use heating.

On the other hand, in a case where a temperature of measurement apparatus side environmental information is within a predetermined range (for example, a range from 18° C. to 22° C.) in a temperature range which is less than the first threshold value and is equal to or more than the second threshold value, the condition determination portion 396B determines that it is necessary to display an image indicating that the user is in a comfortable state regardless of an ultraviolet intensity.

In a case where a temperature of measurement apparatus side environmental information is not within the predetermined range in the temperature range, the condition determination portion 396B determines that it is not necessary to display an image corresponding to the temperature and the ultraviolet intensity.

The operation control portion 397B controls an operation of the timepiece 3B in the same manner as the operation control portion 397.

For example, the operation control portion 397B causes the information transmission portion 394 to transmit the request information at a predetermined timing (for example, a preset time point) in order to display a predetermined image on the display unit 302B. The operation control portion 397B causes the condition determination portion 396B to perform the determination process on the basis of the measurement apparatus side environmental information and the user information.

The operation control portion 397B causes the display control portion 392B to display, on the display unit 302B, an image which is determined as being required to be displayed by the condition determination portion 396B.

Display Control Process in Operation Control System

The image display control is performed by the measurement apparatus 2 and the timepiece 3B performing the same processes as the above-described operation control processes. In this case, the timepiece 3B performs the operation control program.

In the operation control system according to the present embodiment, if request information is transmitted from the timepiece 3B in the above step SB1 as illustrated in FIG. 5, the measurement apparatus 2 transmits the measurement apparatus side environmental information in the above step SA1.

Next, the timepiece 3B receives and acquires the measurement apparatus side environmental information in the above step SB2, and also acquires user information in the above step SB3.

The condition determination portion 396B of the timepiece 3B determines an image required to be displayed on the basis of a temperature and an ultraviolet intensity included in the measurement apparatus side environmental information and the user information in the above step SB4, and the operation control portion 397B causes the display control portion 392B to display the image determined as being required to be displayed by the condition determination portion 396B on the display unit 302B in the above step SB5.

If it is determined that an image is not required to be displayed in the above step SB4, the process is terminated without executing step SB5.

Effects of Third Embodiment

According to the operation control system of the present embodiment described above, it is possible to achieve the following effects in addition to the same effects as those in the operation control system 1.

The timepiece 3B as a wearable apparatus includes the display unit 302B, and the operation control portion 397B controls the content displayed on the display unit 302B on the basis of a measurement result of a temperature in the environment sensor 211 and a measurement result of an ultraviolet intensity in the internal sensor 371. Consequently, it is possible to perform appropriate display suitable for a surrounding environment of the timepiece 3B.

The internal sensor 371 as a first sensor measures an ultraviolet intensity which is an index indicating a surrounding environment of the timepiece 3B, and the environment sensor 211 as a second sensor measures a temperature which is an index indicating a surrounding environment of the measurement apparatus 2. Here, if an ambient temperature of a user is measured by the internal sensor 371 of the timepiece 3B which is a wearable apparatus mounted on the user and is used, a body temperature of the user serves as noise, and thus there is a possibility that the ambient temperature cannot be appropriately measured. In contrast, since the measurement apparatus 2 configured separately from the timepiece 3B measures a temperature, the temperature can be appropriately measured. Therefore, as described above, it is possible to increase a possibility that display suitable for surrounding environments of the measurement apparatus 2 and the timepiece 3B can be performed.

Modification Examples of Embodiments

The invention is not limited to the embodiments, and modifications, alterations, and the like within the scope of being capable of achieving the object of the invention are included in the invention.

In the respective embodiments, the timepieces 3 and 3B, and the pulsimeter 3A have been exemplified as a wearable apparatus. However, this is only an example, and other wearable apparatuses such as a head mounted display may be employed in the operation control system of the embodiments of the invention.

In the first embodiment, the timepiece 3 formed as an analog timepiece has been described. However, this is only an example, and the timepiece 3 may be formed as a digital timepiece. In the third embodiment, the timepiece 3B formed as a digital timepiece has been described. However, this is only an example, and the timepiece 3B may be formed as an analog timepiece. In this case, there may be a configuration in which information presented to a user is indicated at a position of a pointer.

In the first embodiment, the operation control portion 397 controls electric wave reception in the reception unit 33 as the predetermined operation. In the second embodiment, the operation control portion 397A controls change to the power saving mode, display on the display unit 302A, and a notification operation, as the predetermined operation. In the third embodiment, the operation control portion 397B controls display content of the display unit 302B as the predetermined operation. However, these are only examples, and the content of an operation controlled by the operation control portion may be changed as appropriate. For example, the operation control portion may control ON/OFF of a power source of a wearable apparatus. The content of an operation controlled by the operation control portion, such as an operation of which a probability of success changes depending on usage environments or usage states of a measurement apparatus and a wearable apparatus, or an operation suitable for the usage environments and the usage states, may be changed as appropriate.

In the first embodiment, the measurement apparatus 2 includes the environment sensor 211 which is an ultraviolet sensor, and the timepiece 3 which is a wearable apparatus includes the internal sensor 371 which is an illuminance sensor. In the second embodiment, the measurement apparatus 2A includes the environment sensor 211 which is an ultraviolet sensor and the environment sensor 212 which is an illuminance sensor, and the pulsimeter 3A which is a wearable apparatus includes the internal sensor 371 which is a pulse wave sensor and the internal sensor 372 which is an acceleration sensor. In the third embodiment, the measurement apparatus 2 includes the environment sensor 211 which is a temperature sensor, and the timepiece 3B which is a wearable apparatus includes the internal sensor 371 which is an ultraviolet sensor. However, these are only examples, and sensors which can measure other measurement items may be employed as the environment sensor and the internal sensor. The environment sensor and the internal sensor may be sensors measuring the same measurement item. There may be a configuration in which at least one of the measurement apparatus and the wearable apparatus includes a plurality of types of sensors, and can thus measure a plurality of measurement items. In this case, the measurement apparatuses 2 and 2A described in the first to third embodiments may be combined with each other, and further the timepieces 3 and 3B and the pulsimeter 3A may be combined with each other.

Biological information and body motion information of a user are measured by the internal sensor, and thus the accuracy of the information can be increased. On the other hand, the measurement apparatus includes an environment sensor measuring a surrounding environment, and thus it is possible to reduce the influence of noise due to a living body or body motion of a user more than in the wearable apparatus mounted on the user and used.

In the respective embodiments, the measurement apparatuses 2 and 2A are configured to be portable by a user. However, any other configuration may be used, and the measurement apparatuses 2 and 2A may be disposed at a predetermined position. For example, the measurement apparatus 2A of the operation control system 1A according to the second embodiment measures illuminance and an ultraviolet intensity of a place where a user is located, and may thus be disposed indoors.

In the respective embodiments, the respective control units 39, 39A and 39B of the timepieces 3 and 3B and the pulsimeter 3A as wearable apparatuses perform the operation control process by reading and executing the operation control program stored in the storage units 38 and 38A. However, any other configuration may be used, and, for example, there may be a configuration in which the operation control program is read from a recording medium and is executed during execution of the operation control process. For example, as the recording medium, a semiconductor memory may be used. The operation control program may be acquired from an apparatus on a network so as to be executed.

What is claimed is:

1. An operation control system comprising:
a wearable apparatus that is mounted with a first sensor and a first processor, the first sensor including a position sensor receiving a satellite signal; and
a measurement apparatus that is configured separately from the wearable apparatus to be carried separately from the wearable apparatus, and is mounted with a second sensor and a second processor different from the first processor, the second sensor including at least one of an ultraviolet sensor and an acceleration sensor, the second processor being programmed to transmit a measurement result in the second sensor to the wearable apparatus, wherein
the first processor in the wearable apparatus is programmed to:
acquire the measurement result in the second sensor, transmitted from the measurement apparatus;
automatically determine, without a user input, based on the acquired measurement result from the separately configured measurement apparatus, whether the wearable apparatus is in a condition in which the satellite signal can be received by the first sensor; and
based on the determination, control the wearable apparatus to perform a predetermined operation with respect to a receiving state of the first sensor, such that the first sensor is activated to receive the satellite signal in response to determining, based on the acquired measurement result from the separately configured measurement apparatus, that the wearable apparatus is in a condition in which the satellite signal can be received by the first sensor.

2. The operation control system according to claim 1, wherein:
the wearable apparatus receives an electric wave transmitted from outside; and
the first processor is programmed to control reception of the electric wave by the wearable apparatus based on the acquired measurement result in the second sensor.

3. The operation control system according to claim 1, wherein:
the wearable apparatus includes a display that displays predetermined information; and
the first processor is programmed to control display of the predetermined information on the display based on the acquired measurement result in the second sensor.

4. The operation control system according to claim 1, wherein:
the first sensor includes a sensor that measures at least one of biological information of a wearer wearing the wearable apparatus, body motion information of the wearer, and a surrounding environment of the wearable apparatus; and
the second sensor includes a sensor that measures a surrounding environment of the measurement apparatus.

5. A wearable apparatus comprising:
a first sensor including a position sensor receiving a satellite signal; and
a first processor programmed to:
acquire a measurement result in a second sensor from an external apparatus which is separately configured and separately carried from the wearable apparatus, and is mounted with the second sensor and a second processor, the second sensor including at least one of an ultraviolet sensor and an acceleration sensor;

automatically determine, without a user input, based on the acquired measurement result from the separately configured external apparatus, whether the wearable apparatus is in a condition in which the satellite signal can be received by the first sensor; and based on the determination, control the wearable apparatus to perform a predetermined operation with respect to a receiving state of the first sensor, such that the first sensor is activated to receive the satellite signal in response to determining, based on the acquired measurement result from the separately configured external apparatus, that the wearable apparatus is in a condition in which the satellite signal can be received by the first sensor.

6. An operation control method performed by a wearable apparatus mounted with a first sensor and a first processor, the first sensor including a position sensor receiving a satellite signal, the method comprising:

acquiring a measurement result in a second sensor from a measurement apparatus which is configured separately and carried separately from the wearable apparatus, and is mounted with the second sensor and a second processor, the second sensor including at least one of an ultraviolet sensor and an acceleration sensor;

automatically determining, without a user input, based on the acquired measurement result from the separately configured measurement apparatus, whether the wearable apparatus is in a condition in which the satellite signal can be received by the first sensor; and based on the determination, controlling the wearable apparatus to perform a predetermined operation with respect to a receiving state of the first sensor, such that the first sensor is activated to receive the satellite signal in response to determining, based on the acquired measurement result from the separately configured measurement apparatus, that the wearable apparatus is in a condition in which the satellite signal can be received by the first sensor.

7. The operation control system according to claim 1, wherein
when the first sensor is receiving the satellite signal, the predetermined operation is causing the first sensor to stop receiving the satellite signal.

8. The operation control system according to claim 1, wherein
when the first sensor is not receiving the satellite signal, the predetermined operation is causing the first sensor to resume receiving the satellite signal.

9. The wearable apparatus according to claim 6, wherein
when the first sensor is receiving the satellite signal, the predetermined operation is causing the first sensor to stop receiving the satellite signal.

10. The wearable apparatus according to claim 6, wherein
when the first sensor is not receiving the satellite signal, the predetermined operation is causing the first sensor to resume receiving the satellite signal.

* * * * *